Feb. 15, 1972  M. DOLL  3,642,967
METHOD OF PRODUCING NET-LIKE FOAMED THERMOPLASTIC MATERIAL
Filed June 27, 1969  3 Sheets-Sheet 1
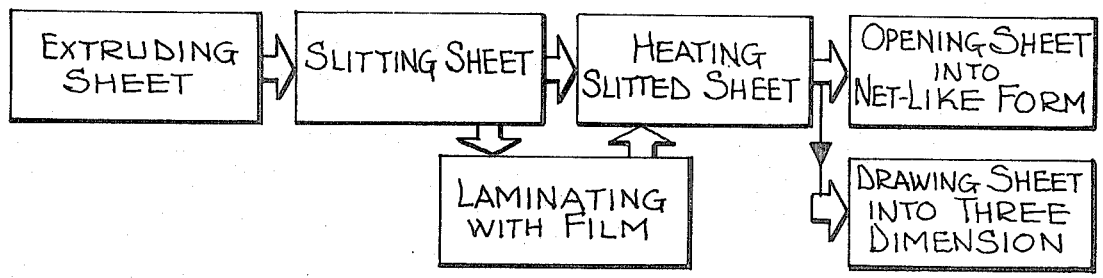
Fig-1
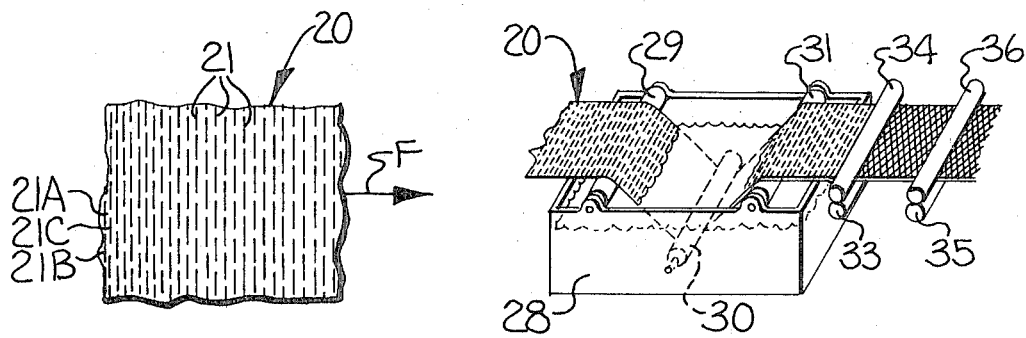
Fig-2  Fig-3
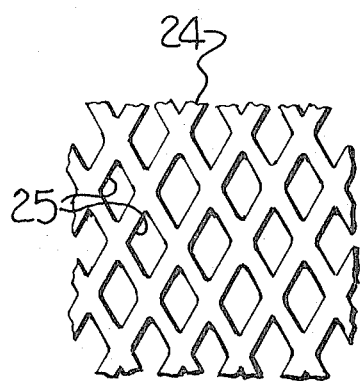  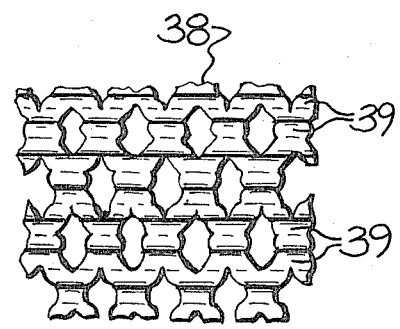
Fig-4  Fig-5
INVENTOR:
MARTIN DOLL
BY Parrott, Bell, Seltzer, Park & Gibson
ATTORNEYS Feb. 15, 1972    M. DOLL    3,642,967
METHOD OF PRODUCING NET-LIKE FOAMED THERMOPLASTIC MATERIAL
Filed June 27, 1969    3 Sheets-Sheet 3

INVENTOR:
MARTIN DOLL

BY Parrott, Bell, Seltzer, Park & Gibson
ATTORNEYS

United States Patent Office 3,642,967
Patented Feb. 15, 1972

3,642,967
METHOD OF PRODUCING NET-LIKE FOAMED THERMOPLASTIC MATERIAL
Martin Doll, Patterson, N.C., assignor to Cellu Products Company, Patterson, N.C.
Filed June 27, 1969, Ser. No. 837,162
Int. Cl. B26f 1/18; B29d 7/24
U.S. Cl. 264—51                                                10 Claims

ABSTRACT OF THE DISCLOSURE

Method of produhcing net-like thermoplastic materials and products formed in accordance with the methods by which properties of thermoplastic materials are applied to provide improved packaging materials, such as wrapping materials, and receptacles through slitting and opening of sheet material and heat setting the material in the opened condition and in any desired configuration.

---

This invention relates to thermoplastic materials, and particularly to methods of producing net-like thermoplastic material for packaging applications and to products produced in accordance with such methods. More particularly, it has been determined that improved packaging materials and receptacles may be provided by utilizing certain properties of both expandable and non-expandable thermoplastic materials. Sheets of the thermoplastic materials are slit in a predetermined manner to form a stock material having spaced rows of spaced incisions, which stock material may be handled, stored and shipped in a highly compact form and may subsequently be formed into packaging materials and receptacles by opening of the incisions into lozenge-like form by a force applied to the material transversely of the rows of incisions and heat setting the material in the opened condition and in any desired configuration.

By way of example but not for limitation, expandable thermoplastic materials may be utilized in accordance with the present invention to provide a variety of products including cushioning material, receptacles and the like. As a cushioning material, the slit, opened and expanded material of this invention is an effective substitute for and provides distinct advantages over cushioning materials presently being used. For example, such slit, opened and expanded material obviates the dusting or partial disintegration problem currently being encountered with the most commonly used cushioning material, which is creped cellulosic wadding, and offers distinct economic advantages over other cushioning materials which are not subject to dusting, such as the cushioning material having pockets of air entrapped between two layers of plastic film.

With the foregoing in mind, it is an object of the present invention to produce an economical stock material which may be stored in minimum space and in a relatively low bulk, high density condition and subsequently prepared for use as a packaging material such as a wrapping material without introduction of a dusting problem or the like. In realizing this object of the present invention, advantage is taken of certain expansibility and settability characteristics of thermoplastic materials, adapted to a method of preparing a thermoplastic sheet for subsequent use and of forming such materials for packaging use.

Examples of receptacles which may be produced in accordance with this invention include, without limitation, disposable trash containers, produce baskets and trays of various configurations, and liquid containing cups. Receptacles of these types are acknowledged to be presently available, but uniformly represent design or economic compromises. Using the specific example of a produce receptacle known as a berry basket, those presently in wide use are either of split wood construction or of molded fibrous pulp or of injection molded thermoplastic. The thermoplastic baskets have the economic advantage of being mass produced, but lack the desirable structural rigidity obtained in the wooden baskets. Similar comparative advantages and disadvantages may be pointed out among the other alternative choices of receptacles presently available.

It is a further object of the present invention to provide a method of producing receptacles from the thermoplastic sheet materials, by which method production disadvantages heretofore encountered are avoided while desired characteristics of the receptacles are enhanced. In realizing this object of the present invention, a receptacle of net-like form is provided as a result of a sequence of steps which includes preparatory slitting of a thermoplastic sheet material and subsequent opening of the slitted areas of the sheet to define a net-like material. By heat setting the thermoplastic material in the opened, net-like condition and in the desired configuration, a receptacle may be formed which has significant structural rigidity imparted thereto and air may freely circulate therethrough.

In producing receptacles in accordance with the present invention, a stock material identical to or closely similar to that used for the other packaging materials of the present invention is employed, opening the possibility that the material to be formed into the receptacles may be shipped from an initial producer to a point of use while in a relatively dense form, and then shaped into receptacles at the point of use. Thus, storage and handling difficulties otherwise present in the use of such receptacles are avoided.

Some of the objects and advantages of the invention having been stated, others will appear as the description proceeds, when taken in connection with the accompanying drawings, in which—

FIG. 1 is a flow diagram of steps to be followed in practicing the methods of the present invention;

FIG. 2 is a plan view of a portion of a slitted sheet in accordance with this invention;

FIG. 3 is a schematic perspective view of an apparatus appropriate for performing certain method steps with the slitted sheet of FIG. 2;

FIG. 4 is an enlarged view similar to FIG. 2, showing a sheet opened into net-like form in accordance with this invention;

FIG. 5 is a view similar to FIG. 4 showing an opened sheet of enhanced drapeability;

Figure 6:
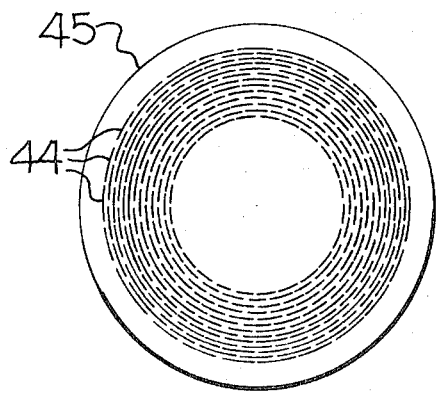
FIG. 6 is a plan view of a second form of slitted sheet in accordance with this invention.

Referring now more particularly to the drawings, the methods and products of the present invention are there illustrated, with the sequence of steps included in the methods of the present invention being shown in a flow diagram and by drawings of the products of the present invention in various stages of formation. While the methods and products of the present invention encompass a number of different species, it is characteristic of all that best results are obtained when thermoplastic materials in sheet form are used in the practice of this invention. At the outset, it is to be noted that the materials herein referred to as sheet materials are to be distinguished from film materials of the types which are widely known and used. Typically, a film material has very little thickness, being measured in mils or hundreths of an inch, and is dimensionally flexible in the sense of having substantially no rigidity in the plane of the film. Sheet materials as used in the practice of the present invention have substantially greater thickness than film materials, on the order of at least twice the thickness of film materials, and have substantial dimensional rigidity in the plane of the sheet as compared to the dimensional rigidity of films.

The present invention uses to advantage a characteristic of thermoplastic materials which is referred to herein as "elastic memory." Elastic memory is that property of thermoplastic materials which results in the material seeking to maintain a particular form or shape until the material is either torn apart or deformed while at an elevated temperature. Typically, the elastic memory of a thermoplastic material may be overcome by heating the material to a predetermined temperature characteristic of the particular material, deforming the material while at an elevated temperature, and then cooling the material below the temperature to set the material in the newly imparted shape. A material so formed is herein referred to as being heat set.

Further, it is preferred for certain end uses that the thermoplastic material forming the sheet 20 be an expandable material. Expandable thermoplastic materials, as the term is herein used, are generally known in the thermoplastic industry, and have heretofore found use in packaging materials. Typically, thermoplastic materials characterized as expandable have a closed cell construction and include a material which may be activated to expand the cells of the thermoplastic material. Agents incorporated into thermoplastic materials to lead to such expansion are herein referred to as blowing agents, with it being recognized that such agents may take the form of fluids incorporated into the thermoplastic material which expand due to chemical reaction or expand due to physical action such as vaporization. One specific example of an expandable thermoplastic material which has been used in practicing the methods of the present invention is expandable polystyrene extruded in sheet form and including a gaseous component which expands on being heated or extruded with air contained in closed cells of the material and cold compressed to reduce the volume of the closed cells prior to handling of the sheet. In any instance, it is preferred that the blowing agent incorporated in the expandable thermoplastic materials be thermally activable, in that subjection of the material to predetermined temperatures initiates action of the blowing agent and expands the closed cells of the thermoplastic materials.

It is a characteristic of expandable thermoplastic materials, as referred to herein, that the ending density of the material may be controlled by controlling the characteristics of blowing agent and the temperatures to which the material is exposed. Thus, the particular composition of the thermoplastic material and blowing agent may be varied to provide an end result material of relatively low density, high bulk and softness, from a starting material which is of relatively high density. As will be pointed out more fully hereinafter, advantage is taken of these possibilities in the manufacture of expandable thermoplastic materials in adaptation of the method and product of the present invention to a number of species of packaging materials.

Broadly viewed, the methods of the present invention result in the production of net-like thermoplastic material by a procedure including the steps shown in the flow chart of FIG. 1. As there summarized, the methods of the present invention include the steps of forming thermoplastic material into sheet form, such as by extrusion; slitting a sheet of thermoplastic material in a predetermined pattern of spaced apart rows of spaced incisions, with the incisions in adjacent rows being a predetermined staggered relation; heating the sheet to a temperature at which any elastic memory of the thermoplastic material is overcome so that the heated sheet will retain a shape imparted thereto; and opening the sheet into net-like form by exerting thereon a force having at least a component directed transversely of the rows of incisions.

Referring now to a particular packaging material, a sheet 20 of thermoplastic material is shown in FIG. 2, with a predetermined pattern of incisions 21 formed therein in accordance with the method of the present invention. In the instance of the sheet 20, the incisions 21 are straight, elongate, equal length incisions cut into the sheet 20 in parallel straight rows with adjacent aligned incisions in each row being spaced apart a distance less than about one-half the length thereof and with the staggered relation of incisions in an adjacent row being such that an adjacent parallel incision equally overlaps the adjacent aligned incisions. This relationship among incisions can be noted from the incisions 21A, 21B, and 21C and will be found to occur throughout the slitted area of the sheet 20. It should be recognized that the present invention contemplates other patterns and arrangements of incisions with the thermoplastic sheet.

Preferably, the incisions 21 extend entirely through the thickness of the sheet 20, in order to facilitate the opening of the incisions as discussed hereinafter. However, it is recognized that the incisions 21 may extend into the sheet 20 for a distance less than the full thickness thereof, with the remaining thickness portion of the sheet 20 being ruptured on opening of the incisions 21.

In forming the slits 21 in the sheet 20 (FIG. 2), it is contemplated that the incisions may be formed in a number of different ways, including without limitation passing the sheet 20 of thermoplastic material between a pair of rollers one of which has spaced knives thereon or passing the sheet across a worktable and beneath a vertically reciprocating blade having spaced incising teeth. Other mechanical arrangements of cutting or incising tools for performing this function will occur to persons skilled in the art of machine design, and it is not intended that the choice of apparatus for performing this function be restricted to those described herein. In providing a sheet to be incised, the sheet may be either extruded or formed to specification or purchased from an appropriate source.

It is to be recognized that the sheet 20 of thermoplastic material having the incisions 21 formed therein is an intermediate product, which has relatively high density as compared to many previously known packaging materials, requires little space for storage and transport, and may be readily handled without disintegration of the material of the sheet 20. Thus, the steps of forming the thermoplastic sheet and slitting the sheet in a predetermined pattern may be performed at one or more locations remote from a location at which the sheet is subsequently to be placed in use, while effecting economies of transport and storage between such locations.

Subsequent to the forming of the sheet of thermoplastic material and slitting thereof, the slitted sheet is formed into a net-like product by opening of the slits into a lozenge-like shape, heat setting of the sheet in the opened condition, and expanding the sheet where the thermoplastic material is an expandable material of the type discussed above. The resultant product is the net-like material of FIG. 4, wherein a sheet 24 having the incisions 25 therein is shown in the opened, expanded condition.

In shaping the sheet 20 into the net-like thermoplastic material 24, the sheet is heated to a temperature at which any elastic memory of the thermoplastic material is overcome, so that the heated sheet will retain a shape imparted thereto. Specifically, such heating permits heat setting of the material in the opened form, with the incisions 25 having a lozenge-like shape as shown in FIG. 4. Opening of the incisions 21 (FIG. 2) into the lozenge-like form of the incisions 25 (FIG. 4) is accomplished by exerting on the sheet a force having at least a component directed transversely to the rows of incisions in the sheet. In the instance of the sheet 20 of FIG. 2, a force is applied to the sheet in the direction of the arrow F, resulting in opening of the incisions.

It is particularly contemplated that the heating of the sheet 20 be accomplished by contacting the sheet with a heated fluid for the transfer of heat from the fluid to the sheet. In the instance where the thermoplastic material is an expandable material having a thermally activable blowing agent therein, the temperature of the heated fluid is at least in excess of the temperature at which the blowing agent is activated. Where the material is an expandable polystyrene having air or other gaseous media incorporated therein as a blowing agent, an appropriate temperature for production conditions has been found to be a temperature of at least about 220° F., with a temperature of 240° F. providing a particularly prompt action and thus being preferred. In such instance, it is preferred that the subjection of the sheet 20 to a heated fluid be accomplished by immersing the sheet in a bath of heated liquid, such as may be maintained within a tank 28 (FIG. 3). Immersion may be carried on as a substantially continuous process by training the sheet over and around suitably arranged guiding rollers 29, 30, and 31.

On the temperature of the sheet being raised to a temperature at which the sheet is sufficiently plastic for opening the incisions therein, opening force may be exerted on the sheet by passage of the sheet between successive pairs of rollers 33, 34 and 35, 36, with a second or downstream pair of rollers 35, 36 being driven with a linear surface speed slightly in excess of that of a pair of rollers 33, 34 which feed the material to the downstream rollers. As a result, the sheet 20 is drafted or drawn between the spaced pairs of rollers, resulting in the exertion thereon of the desired opening force. The sheet may then be cooled to set the same in the opened condition.

While it is recognized that substantially simultaneous operations of heating and opening the slitted sheet of thermoplastic material are particularly advantageous, and are to be preferred as a most efficient way of producing net-like thermoplastic materials in accordance with the present invention, it is further recognized that the sheet 20 may be opened while in a cold condition, maintained in the opened condition by a force sufficient to overcome the elastic memory of the thermoplastic material, and then heated to a temperature such as to overcome the elastic memory. That is, the preferred sequence of heating and opening need not necessarily be followed, but may be varied as desired or required for particular applications to thermoplastic materials. Such variation may be found particularly favorable in working with expandable materials of the type discussed above, following a method in which an opening force is applied to a slitted sheet in cold condition, and the sheet is subsequently heated to set the slits in open form and simultaneously expand the cells of the material. In those instances where the heating and opening of the sheet proceed substantially simultaneously, the use of an expandable thermoplastic sheet results in the expansion proceeding at substantially the same time.

The resulting net-like thermoplastic material 24 (FIG. 4) may be used directly as a packaging material for certain applications, such as wrapping or cushioning. When expanded to a relatively high bulk, the material provides a significant cushioning effect to protect any wrapped object against the transmission of shock, as when the article is packaged in a carton or other container for shipment. Further, the material may have characteristics of rigidity or of drapeability, as required for the particular packaging application. To a certain extent, the rigidity or drapeability of the net-like thermoplastic material reflects the density of the material in expanded form. Drapeability may be enhanced, where so desired, by partial crushing of the expanded, net-like material between a pair of splined rolls (not shown). A drapeable product, such as the sheet 38 of FIG. 5, is characterized by a pattern of crushed areas extending thereover. Where partial crushing is accomplished by a pair of splined rolls, the sheet 38 has spaced apart, parallel elongate crushed areas 39.

Figure 7:
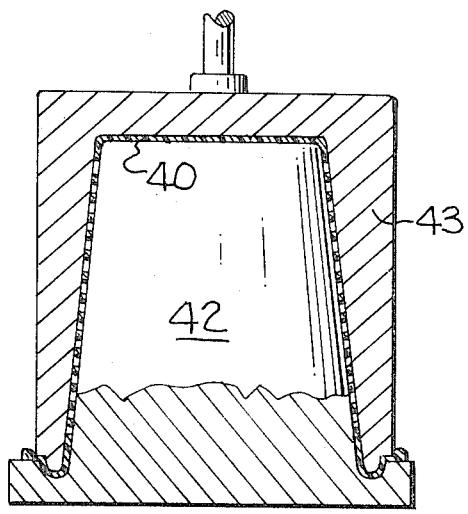
FIG. 7 is a schematic view of an apparatus appropriate for performing certain method steps with the slitted sheet of FIG. 6.

It is contemplated that the methods of the present invention may additionally be applied to the production of three dimensional objects as well as the substantially planar materials discussed to this point. More particularly, it is contemplated that a three dimensional receptacle body form such as a disposable trash basket 40 (FIG. 8) may be produced from thermoplastics processed in accordance with the method of the present invention, by drawing a slitted sheet of thermoplastic material between mating male and female dies 42 and 43 (FIG. 7). In such a drawing process, the sidewalls 41 of the receptacle body 40 may be simultaneously opened into a net-like form or the material could have been previously partially or completely opened into net-like form. Preferably, at least two of the steps of expanding an expandable thermoplastic material, opening slits therein into lozenge-like form, and drawing the sheet into a three dimensional receptacle body proceed substantially simultaneously, and it is recognized by the present invention that all three steps may in fact proceed substantially simultaneously.

Figure 8:
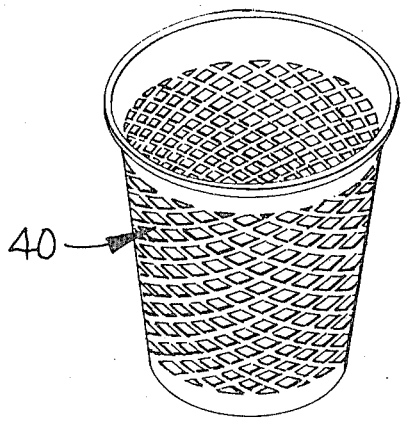
FIG. 8 is a perspective view of a receptacle product formed from the slitted sheet of FIG. 6 in accordance with this invention.

While a slitted sheet such as the sheet 20 of FIG. 2 may be shaped into a three dimensional receptacle body, it is preferred that a receptacle body such as the basket 40 of FIG. 8 be drawn from a sheet material which has a pattern of incisions therein particularly correlated to the shape of the receptacle to be formed by drawing. That is, it is preferred that the incisions have a predetermined positional realtionship one to another such as to provide the open, net-like wall of the receptacle of the desired shape. In the instance where the receptacle has a configuration generally similar to a right circular cone, the incisions 44 formed in a sheet 45 to produce stock material (FIG. 6) from which the receptacle is to be drawn are preferably arcuate, and lie along the circumferences of a plurality of concentric circles on radii of varying lengths and encircling an unslit area which is to form an imperforate bottom for the basket 40.

Figure 9:
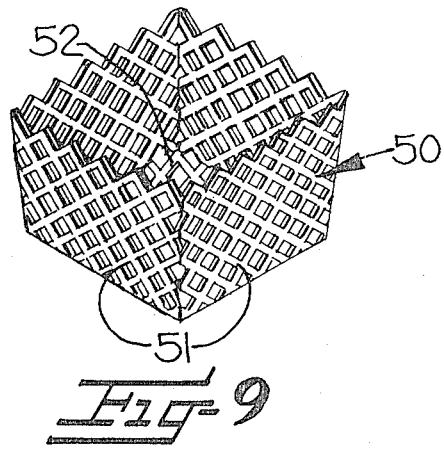
FIG. 9 is a perspective view of a second receptacle formed in accordance with this invention.
Figure 10:
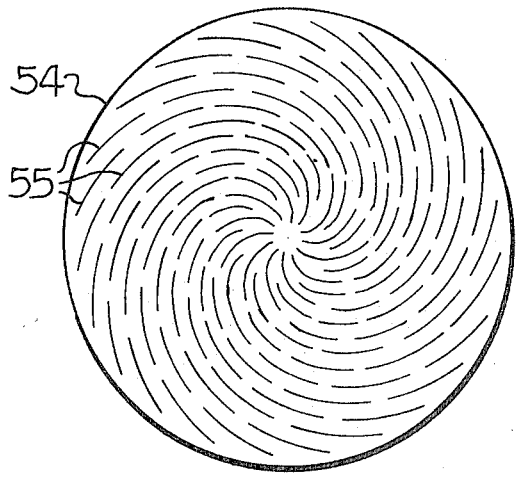
FIG. 10 is a view similar to FIG. 6 of a slitted sheet to be used in producing a third receptacle in accordance with this invention.
Figure 11:
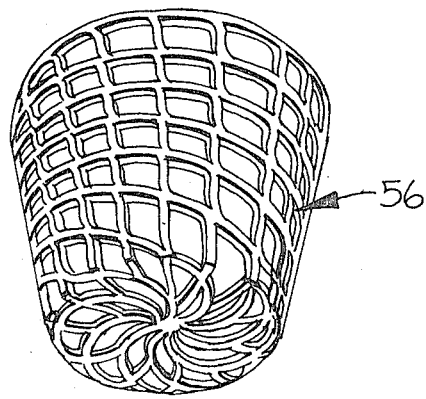
FIG. 11 is a perspective view of a receptacle formed from the blank of FIG. 10.

In drawing a slitted sheet stock material into a three dimensional receptacle body, it is foreseen that some receptacles may desirably be provided with net-like form throughout the entire receptacle body, in order to foster circulation of air about a product contained in the receptacle. Such a receptacle is shown as the berry basket 50 in FIG. 9, having both sidewalls 51 and bottom 52 in net-like form. An alternative round berry basket may be formed from a sheet 54 (FIG. 10) in which the slitted area includes rows of slits 55 extending on spiralling lines, opened to provide net-like sidewalls for the basket 56 (FIG. 11). Alternatively, it is foreseen that some receptacles may be preferred to have an imperforate or solid bottom, in order to better support a greater weight of product contained therein. Such a receptacle is shown as the tomato or produce tray 60 in FIG. 11, having net-like sidewalls 61 and a solid bottom 62. These alternatives may be realized, in accordance with the present invention, by the absence or presence of incisions in that area of the slitted sheet which is to define the base or bottom of the shaped receptacle body and by controlled exertion of opening forces. In the absence of slits and opening force, a solid bottomed receptacle results.

Figure 12:
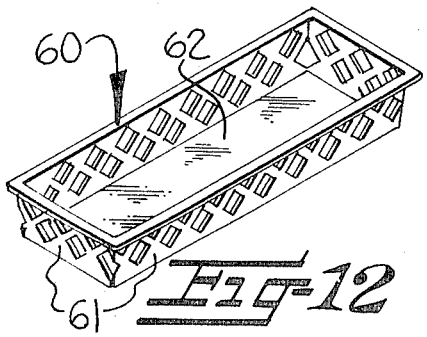
FIG. 12 is a perspective view of a fourth receptacle formed in accordance with this invention.
Figure 13:
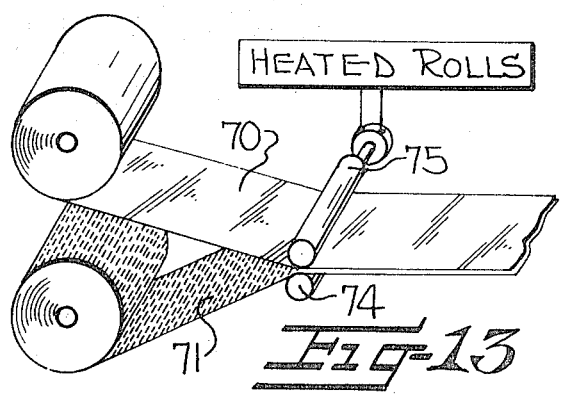
FIG. 13 is a schematic view of an apparatus appropriate for laminating an impervious film to the slitted sheet of FIG. 2.
Figure 14:
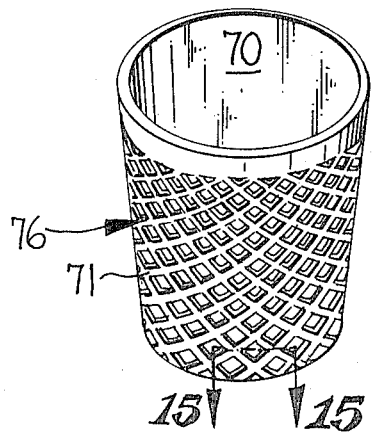
FIG. 14 is a perspective view of a liquid containing receptacle formed from the laminated sheet produced by the apparatus of FIG. 12.
Figure 15:
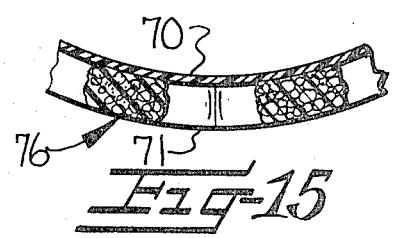
FIG. 15 is an enlarged section view through a portion of the wall of the receptacle of FIG. 14, taken generally along the line 15—15 in that figure.

While discussed to this point primarily with reference to receptacle bodies having perforate walls, for the circulation of air about a product contained therein, it is further recognized that a fluid impervious receptacle may be provided if so desired, in order to receive and contain a liquid. To provide such a receptable body, a thin film material 70 (FIGS. 12–14) impervious to fluids, is laminated to a slitted sheet stock material 71, such as by passing the materials into engagement and between a pair of heated rolls 74, 75 as shown in FIG. 12. On shaping of the laminated construction, a receptacle body such as the cup 76 of FIGS. 13 and 14 is formed which has, by virtue of the film layer 70, a fluid impervious wall. Such receptacles may serve as coffee cups or other liquid receiving containers, and provide thermal insulation between the contents and the hand of a user by reason of the spacing provided by the opened, net-like form of the slitted sheet stock.

In the drawings and specification, there have been set forth preferred embodiments of the invention, and although specific terms are employed, they are used in a generic and descriptive sense only and not for purposes of limitation.

What is claimed is:

1. A method of producing net-like thermoplastic foam material comprising the steps of
    slitting a sheet of thermoplastic foam material in a pattern of spaced apart rows of spaced incisions with the incisions in adjacent rows being in staggered relation,
    heating the sheet of thermoplastic foam material to a temperature where the foam material has sufficient plasticity to be drawn into a different form while further expanding the foam material,
    opening the sheet of foam material into net-like form while the same has said sufficient plasticity by exerting thereon a force having at least a component directed transversely of the rows of incisions, and
    cooling the foam material to set the same in said net-like form.

2. A method according to claim 1 wherein the step of heating comprises contacting the sheet with a heated fluid for the transfer of heat to the sheet from the heated fluid.

3. A method according to claim 2 wherein the step of contacting the sheet with a heated fluid comprises immersing the sheet in a heated liquid.

4. A method according to claim 1 further comprising the step of drawing the heated sheet into a receptacle body form.

5. A method according to claim 1 wherein the step of slitting comprises cutting straight, elongate, equilength incisions into the sheet in parallel straight rows extending across at least a predetermined area of the sheet, with adjacent aligned incisions spaced apart a distance less than about one-half the length thereof and with the staggered relation of incisions in an adjacent row being such that an adjacent parallel incision equally overlaps the adjacent aligned incisions.

6. A method according to claim 1 wherein the step of slitting comprises cutting elongate incisions of predetermined curvilinear configurations into predetermined areas of the sheet in spaced apart curvilinear rows other adjacent predetermined areas of the sheet remaining unslit.

7. A method according to claim 1 wherein the heating raises the temperature of the slitted sheet to at least about 220° F.

8. A method of producing net-like thermoplastic foam material comprising the steps of
    forming thermoplastic material into a sheet of thermoplastic foam material
    slitting the sheet of thermoplastic foam material in a pattern of spaced apart rows of spaced incisions with the incisions in adjacent rows being in staggered relation,
    heating the sheet of thermoplastic foam material to a temperature where the foam material has sufficient plasticity to be drawn into a different form while further expanding the foam material,
    opening the sheet of foam material into net-like form while the same has said sufficient plasticity by exerting thereon a force having at least a component directed transversely of the rows of incisions, and
    cooling the foam material to set the same in said net-like form.

9. A method according to claim 8 wherein the step of forming a sheet comprises extruding thermoplastic material in a form having a width dimension many times greater than the thickness dimension thereof.

10. A method according to claim 9 wherein the steps of heating and opening the slitted sheet proceed substantially simultaneously.

References Cited

UNITED STATES PATENTS

| | | | |
|---|---|---|---|
| 2,582,777 | 1/1952 | Grozinger | 264—154 |
| 2,785,441 | 3/1957 | Blohm et al. | 264—321 XR |
| 3,159,693 | 12/1964 | Plymale | 264—53 |
| 3,441,638 | 4/1969 | Patchell et al. | 264—154 |
| 3,496,260 | 2/1970 | Guenther et al. | 264—156 |
| 3,335,207 | 8/1967 | Richie | 264—48 |
| 3,044,918 | 7/1962 | Wagner | 161—113 |

FOREIGN PATENTS

| | | | |
|---|---|---|---|
| 646,528 | 8/1962 | Canada | 264—154 |
| 682,464 | 3/1964 | Canada | 264—53 |
| 1,032,732 | 6/1966 | Great Britain | 264—321 |
| 1,412,431 | 8/1965 | France | 264—51 |

PHILIP E. ANDERSON, Primary Examiner

U.S. Cl. X.R.

150—48; 161—109, 113, 160; 220—83; 264—147, 156, 210, 288, 321